(12) United States Patent
Ranjan et al.

(10) Patent No.: US 8,890,675 B2
(45) Date of Patent: Nov. 18, 2014

(54) SITE AND ALARM PRIORITIZATION SYSTEM

(75) Inventors: Prabhat Ranjan, Bangalore (IN); Liana Maria Kiff, Minneapolis, MN (US); Jeff Lawry, Medina, OH (US); Michele Berlot, Norton, OH (US); Thomas Gall, Solon, OH (US); Barnali Chetia, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 863 days.

(21) Appl. No.: 12/792,547

(22) Filed: Jun. 2, 2010

(65) Prior Publication Data

US 2011/0298608 A1 Dec. 8, 2011

(51) Int. Cl.
| | |
|---|---|
| G08B 23/00 | (2006.01) |
| G05B 11/01 | (2006.01) |
| G06F 3/048 | (2013.01) |
| G01M 3/04 | (2006.01) |
| G01N 29/00 | (2006.01) |
| G05B 23/02 | (2006.01) |
| G08B 25/00 | (2006.01) |

(52) U.S. Cl.
CPC .......... G08B 25/005 (2013.01); G05B 23/0272 (2013.01)
USPC ........ 340/506; 340/500; 340/691.1; 340/525; 340/605; 700/17; 715/772; 709/223; 709/224

(58) Field of Classification Search
USPC ...................................... 340/506, 500, 691.1
See application file for complete search history.

(56) References Cited

U.S. PATENT DOCUMENTS

| | | | |
|---|---|---|---|
| 4,375,637 A | 3/1983 | Desjardins | |
| 4,816,208 A | 3/1989 | Woods et al. | |
| 5,042,265 A | 8/1991 | Baldwin et al. | |
| 5,161,387 A | 11/1992 | Metcalfe et al. | |
| 5,385,297 A | 1/1995 | Rein et al. | |
| 5,390,206 A | 2/1995 | Rein et al. | |
| 5,708,195 A * | 1/1998 | Kurisu et al. .............. | 73/40.5 R |
| 5,768,119 A | 6/1998 | Havekost et al. | |
| 5,929,761 A | 7/1999 | Van der Laan et al. | |
| 5,946,303 A | 8/1999 | Watson et al. | |
| 5,955,946 A | 9/1999 | Beheshti et al. | |

(Continued)

FOREIGN PATENT DOCUMENTS

| | | |
|---|---|---|
| WO | WO 01/97146 | 12/2001 |
| WO | WO 02/052432 | 7/2002 |

(Continued)

OTHER PUBLICATIONS

Honeywell, "Excel Building Supervisor-Integrated R7044 and FS90 Ver. 2.0," Operator Manual, 70 pages, Apr. 1995.

(Continued)

*Primary Examiner* — Fekadeselassie Girma
(74) *Attorney, Agent, or Firm* — Seager Tufte & Wickhem LLC

(57) ABSTRACT

An approach for site prioritization and then a review and prioritization of the alarms at the site. A feature may to first find the site most in need of attention and then check the alarms of that site. A rule algorithm may determine a prioritization of site according to primitive rules which can be customized and modified nearly at any time making site priority a dynamic determination. At the site, the alarms may be ordered by criticality.

17 Claims, 4 Drawing Sheets

(56) References Cited

U.S. PATENT DOCUMENTS

| | | | |
|---|---|---|---|
| 6,124,790 A | 9/2000 | Golov et al. | |
| 6,178,362 B1 | 1/2001 | Woolard et al. | |
| 6,185,483 B1 | 2/2001 | Drees | |
| 6,223,544 B1 | 5/2001 | Seem | |
| 6,295,526 B1 | 9/2001 | McCormack et al. | |
| 6,295,527 B1 | 9/2001 | McCormack et al. | |
| 6,314,328 B1 | 11/2001 | Powell | |
| 6,351,213 B1 | 2/2002 | Hirsch | |
| 6,356,282 B2 * | 3/2002 | Roytman et al. | 715/736 |
| 6,420,968 B1 | 7/2002 | Hirsch | |
| 6,430,712 B2 | 8/2002 | Lewis | |
| 6,473,407 B1 | 10/2002 | Ditmer et al. | |
| 6,492,901 B1 | 12/2002 | Ridolfo | |
| 6,529,137 B1 * | 3/2003 | Roe | 340/691.1 |
| 6,535,122 B1 | 3/2003 | Bristol | |
| 6,549,135 B2 | 4/2003 | Singh et al. | |
| 6,675,591 B2 | 1/2004 | Singh et al. | |
| 6,681,156 B1 | 1/2004 | Weiss | |
| 6,690,980 B2 | 2/2004 | Powell | |
| 6,813,587 B2 | 11/2004 | McIntyre et al. | |
| 6,816,811 B2 | 11/2004 | Seem | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,947,972 B2 | 9/2005 | Chun | |
| 6,955,302 B2 | 10/2005 | Erdman, Jr. | |
| 6,973,627 B1 | 12/2005 | Appling | |
| 6,990,821 B2 | 1/2006 | Singh et al. | |
| 7,024,283 B2 | 4/2006 | Bicknell | |
| 7,062,389 B2 | 6/2006 | Johnson et al. | |
| 7,068,931 B2 | 6/2006 | Tokunaga | |
| 7,069,181 B2 | 6/2006 | Jerg et al. | |
| 7,085,674 B2 | 8/2006 | Iwasawa | |
| 7,113,085 B2 | 9/2006 | Havekost | |
| 7,171,287 B2 | 1/2007 | Weiss | |
| 7,178,109 B2 * | 2/2007 | Hewson et al. | 715/790 |
| 7,243,044 B2 | 7/2007 | McCalla | |
| 7,250,856 B2 | 7/2007 | Havekost et al. | |
| 7,277,018 B2 | 10/2007 | Reyes et al. | |
| 7,345,580 B2 | 3/2008 | Akamatsu et al. | |
| 7,457,869 B2 | 11/2008 | Kernan | |
| 7,460,020 B2 | 12/2008 | Reyes et al. | |
| 7,596,613 B2 | 9/2009 | Silverthorne et al. | |
| 7,653,459 B2 | 1/2010 | Pouchak et al. | |
| 7,819,334 B2 | 10/2010 | Pouchak et al. | |
| 7,826,929 B2 | 11/2010 | Wacker | |
| 2002/0070972 A1 * | 6/2002 | Windl et al. | 345/777 |
| 2002/0163427 A1 * | 11/2002 | Eryurek et al. | 340/500 |
| 2003/0101009 A1 | 5/2003 | Seem | |
| 2003/0171851 A1 | 9/2003 | Brickfield et al. | |
| 2004/0143510 A1 | 7/2004 | Haeberle et al. | |
| 2005/0038571 A1 | 2/2005 | Brickfield et al. | |
| 2005/0043862 A1 | 2/2005 | Brickfield et al. | |
| 2005/0193285 A1 | 9/2005 | Jeon | |
| 2005/0203490 A1 | 9/2005 | Simonson | |
| 2006/0136558 A1 | 6/2006 | Sheehan et al. | |
| 2006/0168013 A1 | 7/2006 | Wilson et al. | |
| 2006/0253205 A1 | 11/2006 | Gardiner | |
| 2008/0010049 A1 | 1/2008 | Pouchak et al. | |
| 2008/0016493 A1 | 1/2008 | Pouchak et al. | |
| 2008/0115153 A1 | 5/2008 | Brindle | |
| 2008/0125914 A1 | 5/2008 | Wacker | |
| 2009/0113037 A1 | 4/2009 | Pouchak | |
| 2010/0100583 A1 | 4/2010 | Pouchak | |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0156654 A1 * | 6/2010 | Bullemer et al. | 340/691.6 |
| 2010/0287130 A1 * | 11/2010 | Guralnik et al. | 706/47 |
| 2011/0010654 A1 | 1/2011 | Raymond et al. | |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Trane, "System Programming, Tracer Summit Version 14, BMTW-SVP01D-EN," 623 pages, 2002.
Adobe Acrobat 6.0 Standard, Version 6.0.2, Screenshots, 2 pages, May 18, 2004.
U.S. Appl. No. 12/643,865, filed Dec. 21, 2009.
U.S. Appl. No. 12/703,476, filed Feb. 10, 2010.
U.S. Appl. No. 12/722,364, filed Mar. 11, 2010.
U.S. Appl. No. 12/822,997, filed Jun. 24, 2010.
U.S. Appl. No. 12/977,701, filed Dec. 23, 2010.
Honeywell Spyder Bacnet User's Guide, 242 pages, Revised Jul. 2009.
Honeywell Spyder User's Guide 202 pages, Released Jul. 2007.
http://blogs.msdn.com/b/khen1234/archive/2005/05/11/416392.aspx, "Regular Expressions in T-SQL," 4 pages, May 11, 2005.
http://en.wikipedia.org/wiki/JAR_(file_format), "JAR (file format)—Wikipedia, the Free Encyclopedia," 3 pages, printed Dec. 26, 2009.
http://www.google.com/maps, "Google Maps, Pin Location," 1 page, prior to Nov. 21, 2008.
Microsoft Word Screen Shots, 2 pages, prior to Nov. 21, 2008.
Siemens, BACnet for DESIGO 27 Pages, prior to Dec. 30, 2009.
Tridium, "NiagaraAX Product Model Overview," 7 pages, 2005.
Tridium, "Tridium & Niatara Framework Overview," 9 pages, prior to Oct. 28, 2008.

* cited by examiner

| Site List - Last One day Alarm | | | | Switch to: [Alarm View] | | | | | | | | | Page # 1 ▽ of 1 | |
|---|---|---|---|---|---|---|---|---|---|---|---|---|---|---|
| RefreshList | Auto Refresh: No ▽ | | | | | | | | Page Size: 100 ▽ showing: 1-7 of 7 | | | | | |
| Sys Type | Ent | cc | Site# | Site Name | #E | New | S | H | M | L | Total | Highest Priority Unacknowledged | P | Logged GMT + 05:30 | Site Note | Site Connection | Phone1 |
| OPS | GMTN | 000 | 0 | No Site | 0 | | | | | | | | | | | | |
| OPS | GMTN | 000 | 353 | PalmBeachGrdnFL353 | 0 | 51 | 0 | 0 | 0 | 51 | 51 | OpusSupervisorStation | 10 | 2Jun09,11:23 AM | | | |
| OPS | GMTN | 000 | 282 | SpringfieldIL282 | 0 | 57 | 0 | 0 | 0 | 57 | 57 | RTU-29_Office/Lounge | 10 | 2Jun09,11:23 AM | | | |
| OPS | GMTN | 000 | 114 | EauClaireWI114 | 0 | 87 | 0 | 0 | 0 | 87 | 87 | RTU-6_S.Rgt_Frnt | 10 | 2Jun09,11:23 AM | | | |
| OPS | GMTN | 000 | 354 | OcalaFL354 | 0 | 148 | 0 | 0 | 0 | 148 | 148 | RTU-7_Vestibule | 10 | 2Jun09,11:23 AM | | | |
| OPS | GMTN | 000 | 113 | MadisonWI113 | 0 | 156 | 0 | 0 | 0 | 156 | 156 | RTU-11_Arch_Rnge | 10 | 2Jun09,11:23 AM | | | |
| OPS | GMTN | 000 | 343 | RoanokeVA343 | 0 | 415 | 0 | 0 | 0 | 415 | 415 | RTU-12_Receiving | 10 | 2Jun09,11:23 AM | | | |
| | | | | | 0 | 579 | 0 | 0 | 0 | 579 | 579 | RTU-17_Vestibule | 10 | 2Jun09,11:23 AM | | | |

*Figure 3*

SITE AND ALARM PRIORITIZATION SYSTEM

BACKGROUND

The invention pertains to alarms and particularly to alarm management. More particularly, the invention pertains to prioritization as it relates to alarm management

SUMMARY

The invention is an approach for site prioritization and then a review and prioritization of the alarms at the site. A feature may be to first find the site most in need of attention and then check the alarms at the site. A rule algorithm may determine a prioritization of site according to primitive rules which can be customized and modified nearly at any time making site priority a dynamic determination. The alarms may be ordered by criticality at the site.

BRIEF DESCRIPTION OF THE DRAWING

FIG. 3 is a diagram of a screen shot of display showing a site list and alarm statistics.

DESCRIPTION

The present approach may stem from a need to manage and control the site portfolio and increase or decrease the priority of the site based on service level agreements. Some alarm management systems may concentrate deeply on prioritization of alarms, but fail to do the same with respect to the site and the actual system topology. Such systems may lack the ability to decipher and bring attention to the most critical site that needs immediate attention. A small site with few alarms and few modules may require faster attention and more importance then a large site with one item in alarm.

An objective of the present approach may be finding the site most in need of attention, not the highest priority, most persistent, or most ignored individual alarm. There appears to be a demanding need for a rule-based algorithm that is highly flexible and configurable to prioritize the site based on site level data, attributes and the alarm statistics. The algorithm may also need to be based on the continuous alarm patterns for defining the site priority and help in site diagnostics, continuous service, and monitoring and predicting equipment failures at the site. This approach may be regarded as smart site prioritization algorithm for dynamically enhancing the criticality and urgency level of a site, based on site attributes and alarm statistics.

A goal of the present approach is to avoid catastrophic failures at the site through prompt execution of the remedial actions, and to improve the overall operation of the facility, by categorizing the site based on criticality and presenting a site-based alarm management view for immediate and efficient action.

The present approach may relate to an algorithm for using information about alarm statistics at the site, a pattern of alarms at the site, and the site attributes to define and configure priority rules to raise or decrease the level of urgency at the site. A store criticality and urgency may be dependent on numerous attributes, and the varying nature of these attributes may make a site priority dynamic (e.g., a gift store may become a critical site during holidays, otherwise it can be of low priority). A rule algorithm should consider these dynamics at the site, and be aimed at providing efficient filtering options which can meet these demanding natures.

The rules may be customized and modified at any point of time with the changing alarm pattern and some times even due to the changing service level agreement. A service level agreement may sometimes indicate which sites need the most attention.

Figure 1:
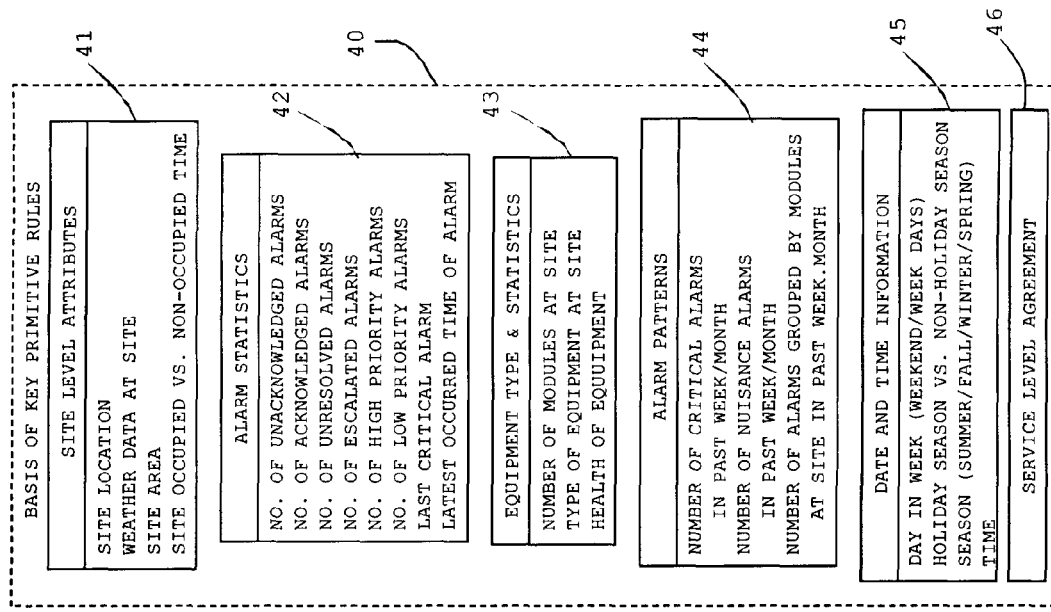
FIG. 1 is a diagram of a basis for primitive rules for a priority determination.

A rule algorithm may be based on key primitive rules which can be predefined. The system may accommodate adding new primitive rules or attributes at run time for creating the prioritization rules, but would necessarily be limited to those items. As illustrated with a diagram of an example in FIG. 1, the basis 40 of key primitive rules may be site level attributes 41, alarm statistics 42, equipment type and statistics 43, alarm pattern 44, date and time information 45; a service level agreement 46; and urgency.

Site level attributes 41 may involve site location, weather data at the site, site area, site type, and site occupied versus non-occupied time.

Alarm statistics 42 may incorporate the number of unacknowledged alarms, the number of acknowledged alarms, the number of unresolved alarms, the number of escalated alarms, the number of high priority alarms, the number of medium priority alarms, the number of low priority alarms, the last critical alarm, and the latest occurred time of an alarm.

Equipment type and statistics 43 may incorporate a number of modules at the site; the type of equipment at the site (e.g., HVAC/lighting/refrigeration), and health of the equipment.

An alarm pattern 44 may incorporate a number of critical alarms in the past 1 week/1 month, a number of nuisance alarms in the past 1 week/1 month, and a number of alarms grouped by modules at the site in the past 1 week/1 month.

Date and time information 45 may incorporate the day of the week (weekend/week days), the holiday season versus the non-holiday season, and the season (i.e., summer, fall, winter, or spring).

Based on the above attributes, a monitoring group may create rules which can prioritize the sites across the enterprises of a system.

The present approach may set the priority of the site coupled with a site list view of the filters and the routing group may display the ordered list of sites in the operator's console with a site needing most immediate attention at the top of the list. The system may then allow the operator to configure a default ordering of the site list view, and prioritize the work based on its own ease and use cases. This may vastly improve the operator's alarm management statistics.

The present approach may provide a quick inherent display of the current alarm statistics at various sites across the globe, which could assist the operator in making a logical decision for the alarm mitigation and management activities. The present approach may help foster ties between the alarm and the site, which combined with the site list order, augmented with default site ordering to place the most important and critical site at the top of the list, would vastly improve operator statistics and the cycle time.

The present approach may take alarm management to a higher level, where rather than prioritizing each and every alarm and event, an algorithm may prioritize a facility or site as a whole.

The present approach may be different from other approaches in that the algorithm can do all the analyses for the operator and direct the operator to the site which needs immediate attention, which would vastly reduce the cycle time of alarm management and give the operator ample time to be online with the site and monitor the health of the site.

The following definitions may be used in the present description. An "alarm group" may refer to an organization of alarms into a logical set. "Alarm routing" may involve using pre-determined algorithms and information about the current system state (i.e., responsibility, logged-in operators, workload, escalation conditions, and so forth) and automatically assign an alarm or alarms to a specific operator or group of operators for follow-through. A "rule engine" may be an intuitive user interface, for creating rules for alarm management and system configuration. An "enterprise model" may be a comprehensive specification of information that describes the entities in a typical and monitored enterprise in a hierarchical structure representing the scope of control. A "filter" may incorporate a set of parameters that define the items of interest from a larger set of items, by specifying terms to include or to exclude from a specified set of data points. Filters may affect the display of alarm records to the end user. "Nuisance alarms" may be alarms that are perceived to have no value in the overall management of a facility, based on criteria to be set and managed by operations personnel, including administrators and alarm console operators.

Figure 2:
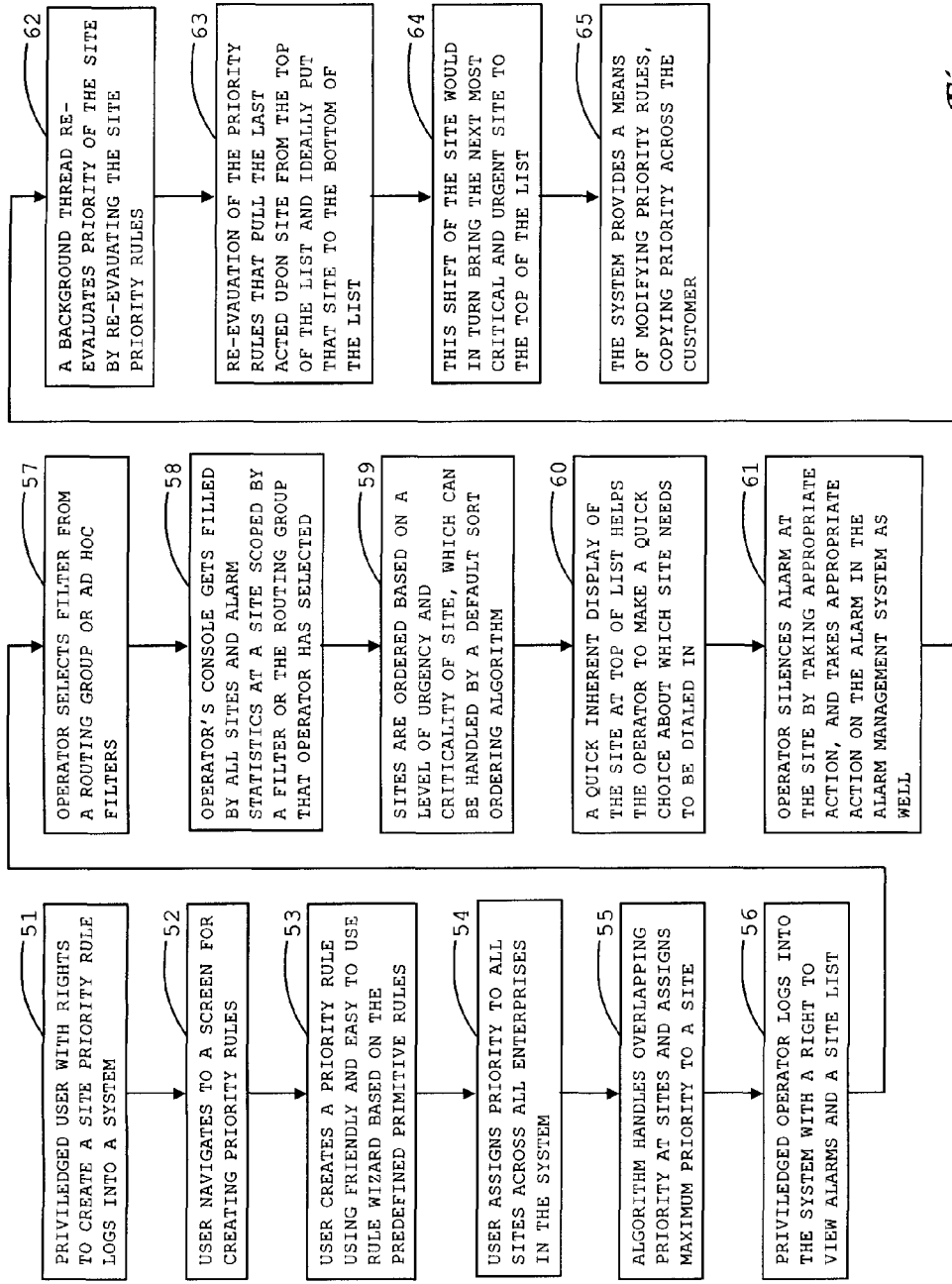
FIG. 2 is a block diagram of the present approach.

The details of the present approach may incorporate the following items as shown in FIG. 2. A privileged user with rights to create site priority rule logs into the system at symbol 51; 2) A user navigating to the screen for creating site priority rules at symbol 52; 3) A privileged user creating the priority rule using friendly and easy to use rule wizard based on the predefined primitive rules at symbol 53; 4) A privileged user assigning priority to all the sites across all the enterprises in the system at symbol 54; 5) An overlapping priority at the sites being handled by the algorithm which will assign the maximum priority to a site at symbol 55; 6) A privileged operator logging into the system with the right to view alarms and the site list at symbol 56; 7) An operator selecting filters from a routing group or ad hoc filters at symbol 57; and 8) An operator's console getting filled by all the sites and the alarm statistics at the sites scoped by the filter or the routing group that the operator has selected at symbol 58.

The present approach may further incorporate the following items: 9) Sites ordered based on the level of urgency and criticality of the site, which can be handled by a default sort ordering algorithm at symbol 59; 10) A quick inherent display of the site at the top of list, helping an operator in making a quick choice about which site needs to be dialed in at symbol 60; 11) A operator silencing the alarm at the site by taking appropriate action, including action on the alarm in the alarm management system as well at symbol 61; 12) The background thread re-evaluating the priority of the site by re-evaluating the site priority rules at symbol 62; 13) Re-evaluating priority rules that pull the last acted upon site from the top of the list and ideally with that site going to the bottom at the list at symbol 63; 14) This evaluation in turn bringing the next most critical and urgent site to the top of the list at symbol 64; and 15) The system providing a mechanism for modifying priority rules, and copying priority across a customer at symbol 65.

The following view details how the alarm information may be presented in a more condensed way by summarizing the alarm statistics and displaying the site-based alarm view. The view may allow the operator to take immediate action for the alarm which is at the top of the list for the respective site, as the site prioritization algorithm has already evaluated the criticality of all the sites across enterprises, and placed the site which needs immediate attention at the top of the list.

FIG. 3 is a diagram showing a screen shot 11 of a site list of groups/filters. A list 12 of sites in alarms may be ordered by criticality of the alarms at the respective site. On screen shot 11, alarm statistics at the site may be ordered by criticality at the site. Column 14 shows the locations of the various sites. Column 15 shows the site number of the respective location. These sites may be, for example, various stores of a large national chain. Screen shot 11 shows a site list of a last one day alarm and shows an alarm view of each site with such an alarm.

Figure 4:
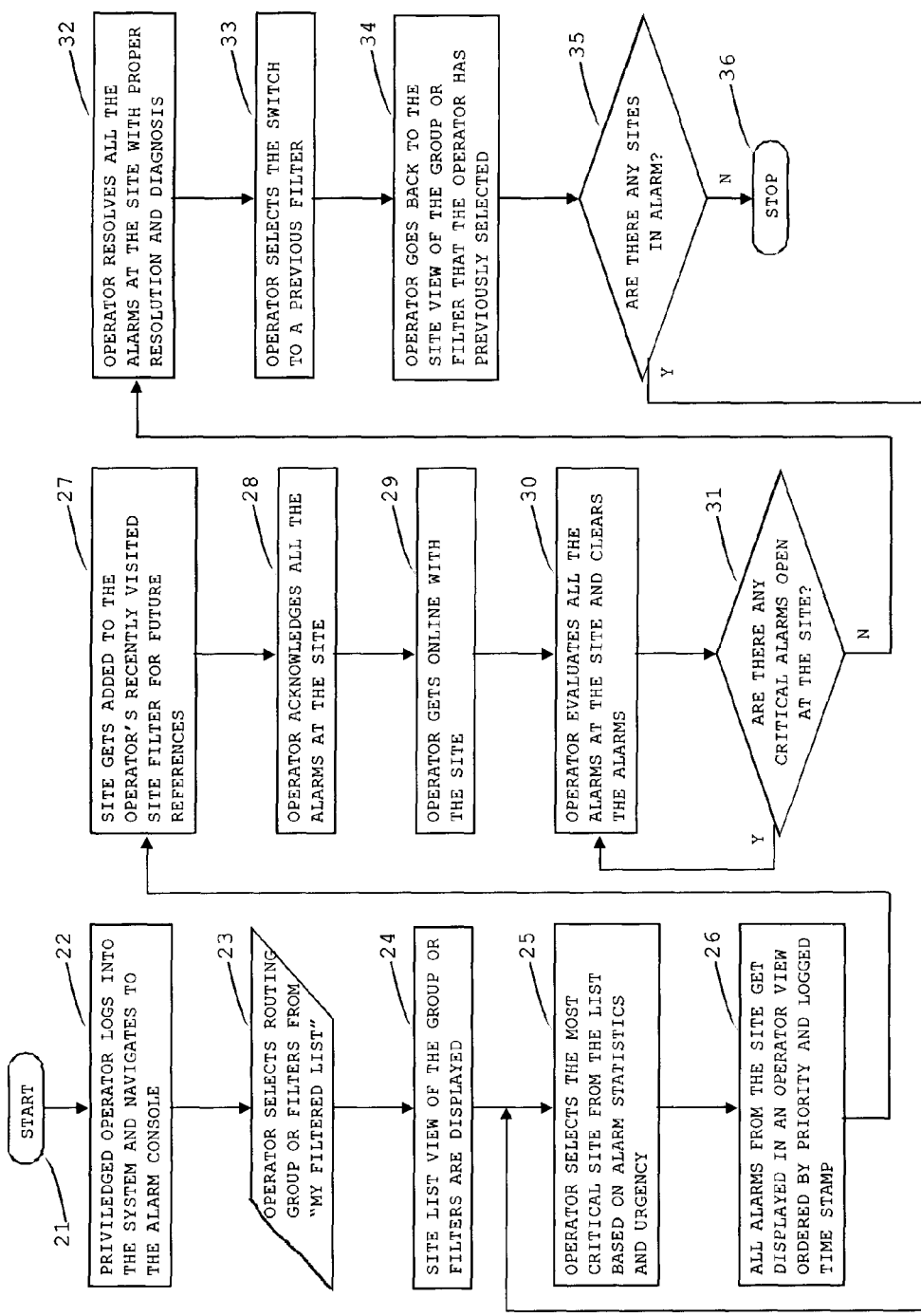
FIG. 4 is a block diagram showing a site based alarm management workflow.

A flowchart may show the various steps involved in a site based alarm management strategy. FIG. 4 is a diagram of a site based alarm management workflow system. The items of the system are indicated in symbols labeled generally in a numerical order. After a start 21 and a privileged operator logging in the system and navigating to the alarm console at symbol 22, the operator may select a routing role (group) or filters from a filter list at symbol 23. At symbol 24, a site list view of the group or the filters may be displayed. The operator may select a most critical site from the list based on alarm statistics and urgency at symbol 25. All the alarms from the site may be displayed in a user view ordered by priority and a logged time stamp at symbol 26. The site may be added to the operator's recently visited site filter for future references at symbol 27. At symbol 28, the operator may acknowledge all the alarms at the site. The operator may get online with the site at symbol 29. The operator may evaluate all the alarms at the site and clear the alarms at symbol 30. A question at symbol 31 may be whether there is any critical alarm open at the site. If the answer is "yes", then the operator may evaluate all the alarms at the site and clear the critical alarm at symbol 30. If the answer is "no", then the operator may resolve all the alarms at the site with proper resolution and diagnosis at symbol 32. At symbol 33, the operator may select a switch to a previous filter. At symbol 34, the operator may go back to the site view of the group or filter that the operator has previously selected. A question, whether there are any sites in an alarm status, may be asked at symbol 35. If the answer is "yes", then the actions at symbols 25-34 may be repeated. If the answer is "no", then the workflow may stop at symbol 36.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method of prioritizing alarms received from two or more sites located at different geographical locations, the method comprising:
   providing a filter having a priority scenario, the priority scenario is based at least in part on one or more site level attributes, wherein the sites are located at two or more different geographical locations;
   applying the filter to a system of sites to arrange the sites into a list according to the priority scenario applying an order of priority for the sites, where a site having a highest priority is at a top of the list;
   doing an alarm review of the site at the top of the list to order the alarms at the site by criticality of the alarms based on ease and uses cases of the particular site and select out any existing active alarm or alarms of the site;

silencing the existing active alarm or alarms by taking appropriate action; and re-evaluating a priority of the site having the active alarm or alarms which were silenced; and wherein:

re-evaluating the priority pulls the last acted upon site having no longer an active alarm from the top of the list and places the site lower in the list; and the order of priority for the sites is according to a level of urgency and criticality associated with a particular site.

2. The method of claim 1, further comprising doing an alarm review of another site at the top of the list.

3. The method of claim 1, wherein the priority scenario is created from predefined primitive rules.

4. The method of claim 1, wherein the order of priority is provided by a sort-ordering algorithm.

5. The method of claim 1, wherein the filter is selected from a routing group or ad hoc filters.

6. The method of claim 3, wherein a background thread re-evaluates the priority of a site having the alarm or alarms silenced, by re-evaluating the predefined primitive rules.

7. The method of claim 3, wherein an overlapping priority of numerous sites in the list is resolved by a priority algorithm which selects and assigns a maximum priority to just one of the numerous sites.

8. The method of claim 3, wherein the predefined primitive rules are based on:
  alarm statistics;
  alarm patterns;
  equipment data;
  date and time information;
  a service level agreement; and/or
  urgency.

9. The method of claim 1, wherein site level attributes comprise:
  site location;
  site weather data;
  site area;
  site type; and/or
  site occupied versus non-occupied time.

10. The method of claim 8, wherein alarm statistics comprise:
  a number of unacknowledged alarms;
  a number of acknowledged alarms;
  a number of unresolved alarms;
  a number of escalated alarms
  a number of high priority alarms;
  a number of medium priority alarms;
  a number of low priority alarms;
  a last critical alarm; and/or
  a latest occurred time of an alarm.

11. The method of claim 8, wherein equipment data comprise:
  a number of equipment modules at a site;
  a type of equipment at the site; and/or
  health of the equipment.

12. The method of claim 8, wherein alarm patterns comprise:
  a number of critical alarms in a given past period of time;
  a number of nuisance alarms in a given past period of time; and/or
  a number of alarms grouped by modules at a site in a given past period of time.

13. The method of claim 8, wherein date and time information comprise:
  a day in a week;
  a holiday season or non-holiday season;
  a spring, summer, fall or winter season; and/or
  a time of day.

14. A site and alarm management system comprising:
  a display displaying site prioritization and alarm prioritization information on at least one screen, the site prioritization and alarm prioritization information including:
  a routing group or filter selected from a list of groups and filters, by a first selection algorithm;
  a site list resulting from application of the routing group or filter to a portfolio of sites;
  a most critical site at top of the site list, wherein the most critical site is selected by a second selection algorithm; and
  alarms from the most critical site, listed in an order by a third selection algorithm, are evaluated and active alarms are cleared, resulting in the most critical site being no longer the most critical site on the site list and
  wherein:
  the second selection algorithm selects the most critical site according to alarm statistics and urgency;
  the third selection algorithm lists the alarms from the most critical site in the order according to a priority and logged time stamp; and
  the active alarms are cleared with diagnosis and resolution.

15. The system of claim 14, further comprising another most critical site on the site list treated in a similar manner as a previous most critical site.

16. A site prioritization system comprising:
  a computer based system configured to display site prioritization on a display, the computer based system including a memory storing:
  a filter;
  a prioritized site list resulting from an application of the filter to sites in a system;
  a most critical site placed at a top of the site list is selected according to primitive rules;
  alarms from the most critical site are listed according to an order based at least in part on an alarm priority and a timestamp, wherein active alarms of the site are cleared, resulting in the most critical site being no longer the most critical site being at the top of the site list;
  any subsequent most critical site selected from the top of the site list; and
  alarms from the any subsequent most critical site are tasted according to an order, wherein active alarms of the site are cleared, resulting in the any subsequent most critical site being no longer the most critical site being at the top of the site list.

17. The system of claim 16, wherein:
primitive rules are based on:
  site level attributes;
  alarm statistics;
  alarm patterns;
  equipment data;
  date and time information;
  a service level agreement; and/or
  urgency;
  the order is based on priority and a logged time stamp; and
  active alarms are cleared with diagnosis and resolution.

* * * * *